Jan. 31, 1956
L. F. STREET
2,733,051
BLENDING PLASTICS AND FLUIDS
Filed Aug. 16, 1952
3 Sheets-Sheet 1
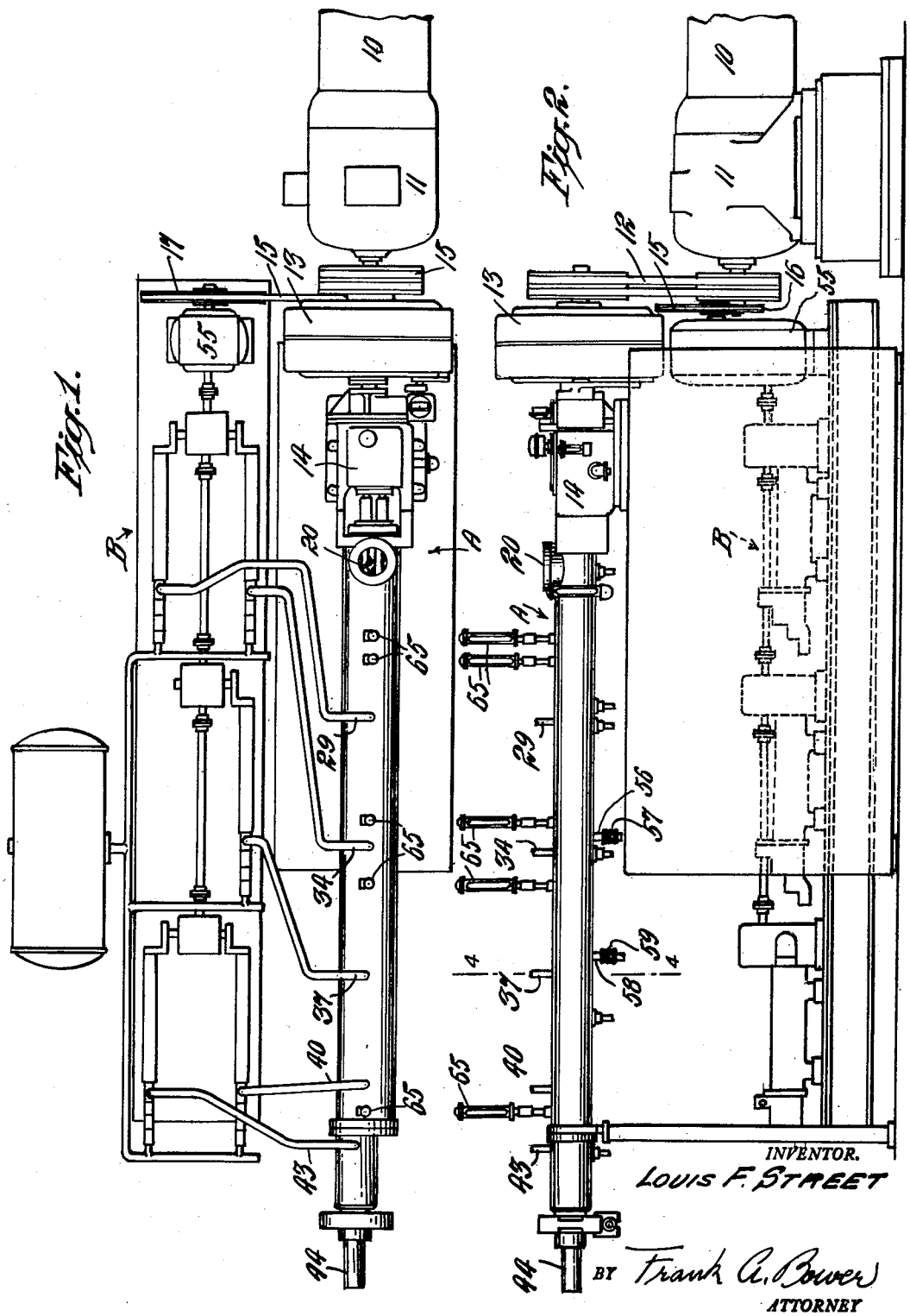
INVENTOR.
LOUIS F. STREET
BY Frank A. Bower
ATTORNEY

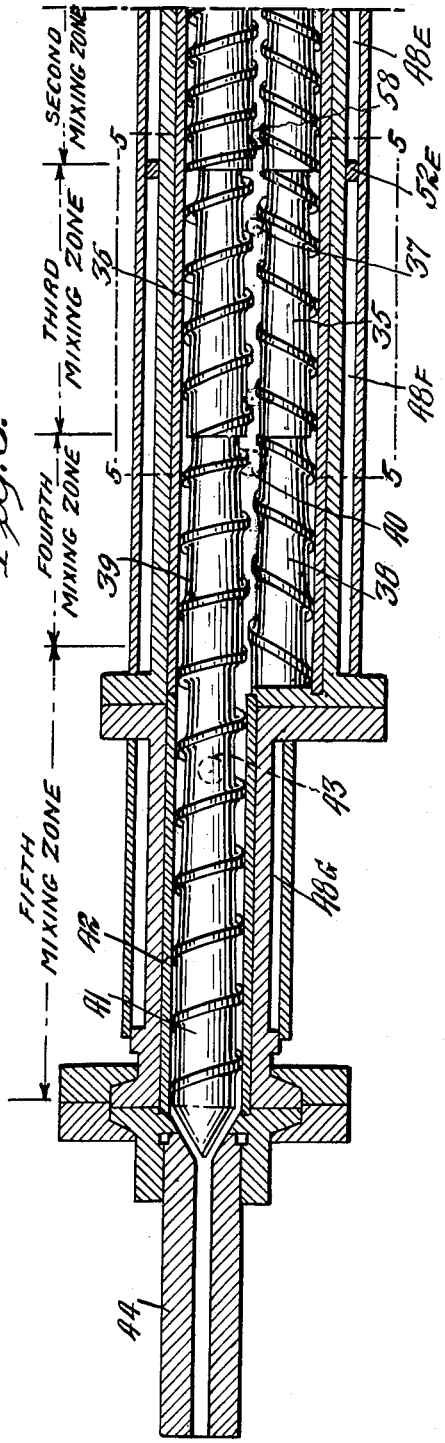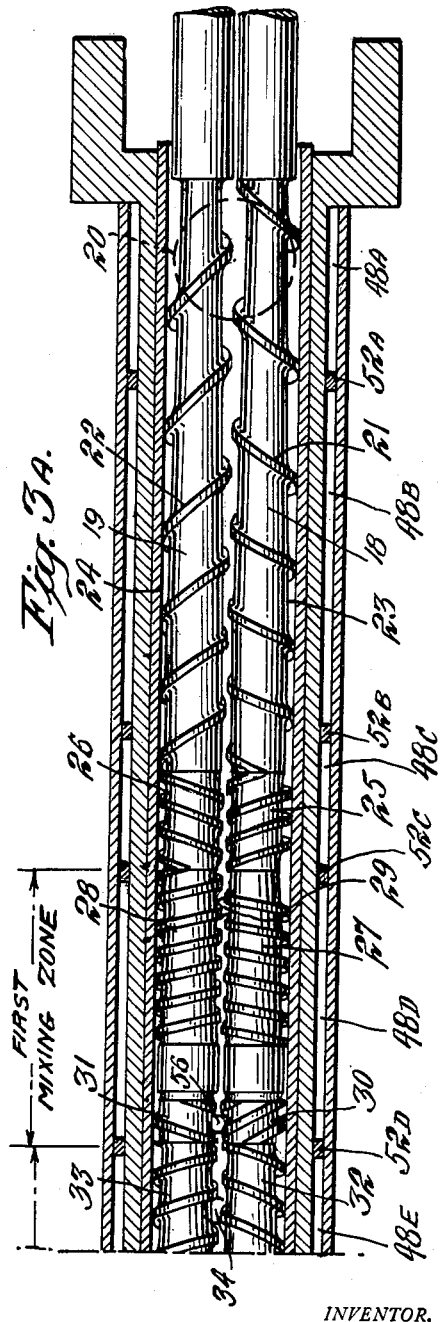

Jan. 31, 1956
L. F. STREET
2,733,051
BLENDING PLASTICS AND FLUIDS
Filed Aug. 16, 1952
3 Sheets-Sheet 3
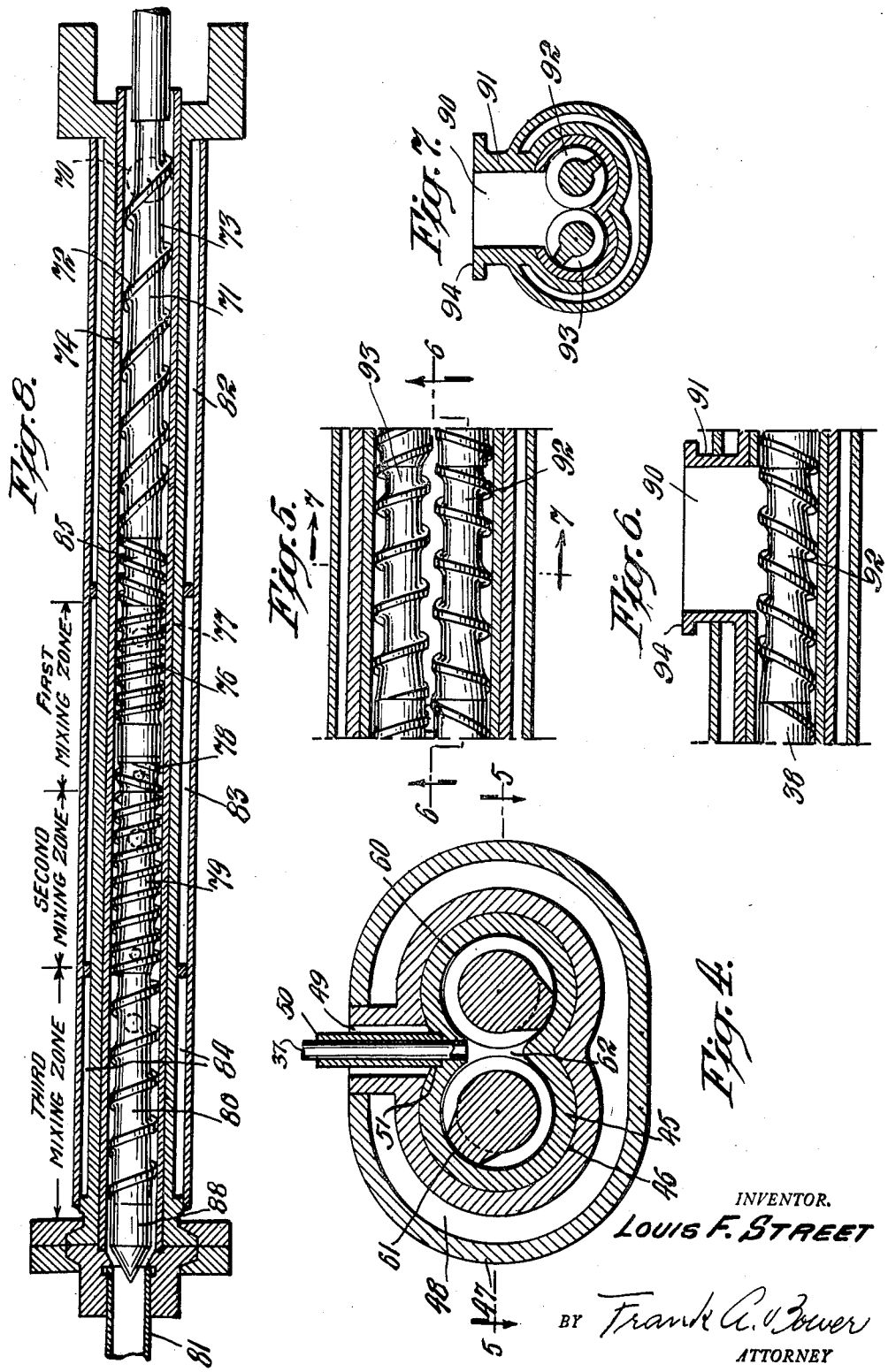
INVENTOR.
LOUIS F. STREET
BY Frank A. Bower
ATTORNEY

United States Patent Office 2,733,051
Patented Jan. 31, 1956

2,733,051

BLENDING PLASTICS AND FLUIDS

Louis F. Street, Norristown, Pa., assignor to Welding Engineers, Inc., Norristown, Pa., a corporation of Delaware Application August 16, 1952, Serial No. 304,686

23 Claims. (Cl. 259—6)

This invention relates to the mixing of plastics and fluids with plastics and particularly to the continuous intermixing of these materials in effective controllable manner.

An object of this invention is to provide a continuous and economical method of mixing plastics and fluids with plastics.

A further object of the invention is to provide a means of introducing fluids into a plastic without interrupting the mixing process, which fluids otherwise might interfere with or stop the continuous feeding of the plastic.

A further object of the invention is to provide a continuous mixing device that permits wide variability in its operating techniques and accomplishments.

A further object of the invention is to provide a continuous mixing and chemical reacting method in which various ingredients can be inserted into the stream of material at desired points and volatiles removed as desired.

The present system provides a continuous and economical method of mixing to replace the batch method and to permit the mixing of plastics and/or the addition of large proportions of plasticizer to a resin or plastic which would be otherwise impossible in practice in an extruder. Mixes of different plastics in any proportion or the introduction of plasticizer in the order of 50% plasticizer and 50% plastic are feasible with the system herein described. Obvious modifications as described in the specifications will permit even greater mixing capacity.

In the accompanying drawings illustrating the invention,

Figure 1 is a plan view of the apparatus;

Figure 2 is an elevation of the apparatus shown in Figure 1;

Figures 3 and 3a constitute a horizontal sectional view showing the feed worms and associated casing;

Figure 4 is a cross section through the apparatus at line 4—4 in Figure 2;

Figure 5 is a horizontal sectional view showing a modification of the invention in the vicinity of line 5—5 of Figure 4;

Figure 6 is a vertical sectional view taken on line 6—6 of Figure 5;

Figure 7 is a cross section through the apparatus at line 7—7 in Figure 5; and

Figure 8 is a horizontal sectional view of a modification of the invention showing a single worm used for the feeding and mixing of the materials.

In the form shown in Figures 1 to 4, plastic material is introduced into the feed hopper opening 20 from a feeder or is measured in by hand, or fed in sufficient quantities to keep the feed worms full so that the normal delivery rate of the feed worms 18, 19 will advance it at a uniform and predetermined rate. In the device shown the worms rotate in opposite direction. The helices 21, 22 of the feed worms on the stems 23 seize the material and the action of these worms against the surface of the casing 24 generates a pressure and forward motion on the material, moving it toward the compounding worms 25, 26. The compounding worms are so designed as to offer a restriction to the forward motion of the material and the joint action by the feed worms and compounding worms compresses the material and generates heat. The compounding worms 25, 26 may be designed as shown with a reverse flight or may be made of plain cylinders with clearance in the casing for the passage of material or such other design as to generate proper pressure on the material and provide a seal in the casing so that oil which is introduced further along in the machine cannot escape past the material and travel back toward the hopper in the machine and cause slip on the material which is held by the feed worms 18, 19 and the casing 24. The greater pressure generated by the feed worms forces the material through the compounding worms and into the first mixing zone, while a substantially uniform condition has been created throughout the mass of the material. The plastic material is seized by the mixing worms 27, 28 which immediately start to generate a pressure and a forward motion of the material. The rear end of these worms (next to the compounding worms) is of sufficient capacity to permit ready acceptance of an initial amount of plasticizer forced in through the first injection port 29 of the first mixing zone. The material continues to advance and due to the action of the mixing worms 27 and 28, the plasticizer starts to be distributed throughout the plastic. In the arrangement illustrated, another stage of compounding worms 30, 31 further treats the material as it passes through under the pressure generated by the mixing worms 27 and 28. It is desirable to adjust the amount of plasticizer forced into the material in this first mixing zone so that the mix is substantially uniform by the time it leaves this zone.

After the material leaves the worms of the first mixing zone, it is received by the forward moving helices of the worms 32, 33 of the second zone. An additional portion of plasticizer is introduced through inlet 34 and the mixing cycle is repeated. In the apparatus illustrated, no compounding worm is shown in this second mixing zone. Instead, the depth of the worm flights is considerably reduced toward the front end so that a smearing and mixing action takes place. The material then passes into the third mixing zone and is treated by worms 35, 36 for another mixing cycle. As the volume of material has now increased due to the continual increase in plasticizer content, the worms in this zone can be made with a greater volume by changing the design to that of a longer pitch or a deeper flight as seems indicated. Additional plasticizer is injected in the third zone through inlet 37, the stem being expanded as shown. The material then moves into the fourth zone where it is treated by worms 38, 39 and plasticizer is injected through inlet 40, the stem being again expanded.

In the apparatus illustrated, an additional mixing zone receives the material and comprises a single worm 41 surrounded by a cylindrical casing 42 and now this single worm operates on all of the material. If desired, a cylindrical torpedo having a close clearance with the barrel casing 42 can be installed on the front portion of worm 41 as shown at 88 on worm 80 in Fig. 8 or the torpedo may be at an intermediate point in this worm. More plasticizer may be injected if desired at inlet 43.

The material is next expelled through the die 44. On leaving the die orifice, the product is caught by any suitable means. Instead of the die shown, a pipe line can be installed on the discharge end of the machine and the material piped for some distance and discharged at a point remote from the apparatus or if the product is sufficiently stiff, it can be extruded in a desired shape.

The worms are surrounded throughout their length by a casing 24 having an internal shape of adjacent cylindrical bores. Normally two parallel bores 60, 61 are of the same diameter and the distance between their centers is approximately equal to this diameter with a longitudinal opening 62 between the two bores adjacent the line of tangency. The worms fit closely in their respective portions of the casing with a small running clearance preferably not more than a few thousandths of an inch. In the design shown, the casing is equipped with removable liners 45 which are pressed into the surrounding casing which provides a heat control jacket around the casing. The inner wall 46 of this casing is bored for a press fit with the outside surface of the liner 45. Another jacket 47 is present and the space 48 is left for the circulation of a heat transfer medium. Thermometers 65 can be used to indicate the temperature of the circulating medium. Also thermocouples or other means may be installed to take temperatures of liner 45.

An opening 49 is provided in the casing for the passage of injection oil line 50 (Fig. 4) which is fastened at 51 with a pressure tight joint to the liner 45. The liner 45 can be entirely eliminated and the casing constructed so that its inner surface is at the point where the represented inner surface of the liner is now shown. The removable liner is used for purposes of economy in that it can be replaced after wear more economically than by the replacement of the entire casing. The jacket space 48 can be divided through the use of bulkheads 52A, 52B, 52C, 52D, 52E into transverse sections 48A, 48B, 48C, 48D, 48E, 48F and 48G as desired for greater flexibility in temperature control.

As can be clearly seen from this description of the apparatus and its functioning, the number of zones and mixing cycles as well as the design of the worms can be changed from the arrangement shown in this specification without departing from the nature of the invention.

Referring to Figures 1 and 2, the mixing apparatus as just described is present generally at A and the plastic is fed through feed opening 20. The plasticizer supply comes from the apparatus present generally at B and is moved to the machine by means of high pressure positive displacement pumps. When the material being acted on is a liquid, the positive displacement action of the pumps gives sufficient accuracy for the delivery of a predetermined weight of material. In the apparatus shown these are reciprocating piston pumps although equipment of any other design that would perform the same function would be satisfactory. The pumps must be able to generate enough pressure to force the plasticizer into the mixer by overcoming the internal pressure of the plastic. It is desirable to use an individual pump for each plasticizer inlet to the mixing apparatus since if one pump feeds more than one opening there is a possibility that all of the feed will go through one opening and none through the others. In the device shown, each pump can have its delivery varied through varying the length of stroke. It is also possible to vary the overall delivery of the group of pumps by changing their drive speeds through variable speed control means 55.

The drive means illustrated has desirable features. The entire installation is driven by electric motor 10 which has variable speed means 11 incorporated with it. Through sheaves and belts 12, gear reducer 13 is powered and the drive is transmitted through gear box 14 to the worms previously described. Also driven by the variable speed motor is sheave 16 and V-belt 15 and sheave 17 which drives variable speed means 55 which controls the action of the plasticizer pumps. Thus by changing the output of the main drive motor 10 through its variable speed means 11, the rate of rotation of the worms in the mixing device and the rate of reciprocation of the pump pistons will increase or decrease, each by the same proportion. The plasticizer amount will be increased or decreased accordingly, and providing the feed of plastic which is fed by the means previously discussed is adjusted in this same proportion, the overall output of the apparatus will rise or fall accordingly without a change in the proportions of the ingredients. If, however, it is found that the proportion of plasticizer is too great or too small to produce the desired quality in the finished material, the total amount of plasticizer can be reduced or increased through adjustment of variable speed means 55, or the delivery from any one pump can be adjusted through varying the length of stroke. These features of variable operation offer wide flexibility in performing a variety of operations.

Near the forward end of the first mixing zone a sampling outlet 56 preferably on the bottom and with a valve 57 permits material to be withdrawn from this section without interrupting the operation of the apparatus. This sample can be observed as to quality of mixing and thus permit the adjustment of operating conditions to be made on the basis of definite knowledge as to the condition of the material in this stage of the mixing process. Another sampling outlet 58 with valve 59 is shown in the second mixing zone. These outlets can be present in as many or as few zones as is deemed desirable.

In the arrangement shown in Figures 1, 2, 3 and 4, there are five plasticizer injection ports. This arrangement permits a relatively small amount of the plasticizer to be introduced and mixed in the first mixing zone and then additional plasticizer added in the subsequent zones as desired. For example, in a mixture of Vistanex with paraffin, the most difficult part of the mixing operation is the blending of the initial portion of paraffin and its thorough mixing with Vistanex. As the proportion of paraffin which is thoroughly mixed with the Vistanex increases, it continually becomes easier to mix in the next portion of the paraffin. In such a case, it may be highly advantageous to add a small amount of plasticizer, say 5%, mix it thoroughly, then add another small but perhaps somewhat larger percentage of plasticizer, and so on. By adding small amounts of plasticizer initially, the general character of the mix is only slightly softened and the thorough mixing-in of the plasticizer is much simplified.

Adding the entire plasticizer content at one point is not satisfactory because some portions of the plasticizer and Vistanex are mixed together, providing a soft matrix in which relatively unplasticized and harder particles of Vistanex that have not been blended are carried, and the plasticizing of these particles becomes very difficult. The material in which they move is so soft that little shear or mixing effect can be exerted except by direct mechanical contact on the unplasticized particles.

As can be readily seen from a study of the apparatus, it is possible to add a properly softened thermoplastic material as the plasticizer through pumps or extruders or the like.

The injection of different materials at the different plasticizer inlets may be made as desired. In the case where a sequence of mixing operations is to be performed by adding one fluid ingredient to the plastic and first mixing this ingredient thoroughly and then adding a different material which is mixed in as a second step, a very desirable effect will produced.

The introduction of different fluids through different inlets is a procedure of very great importance when the materials do not merely mix and disperse in a physical manner but there is a chemical reaction and a changing in chemical structure of the materials. A plastic is fed at the hopper of the machine, then a fluid which will react with the plastic is fed through the plasticizer inlet and a catalyst or other substance through a subsequent plasticizer inlet bringing about a reaction between the first two ingredients and then the reacting and mixing continues through a short or long mixing zone or successive zones as required. The time and temperature requirements of the reaction would guide the details of the apparatus construction for each particular operation.

In many cases, a chemical reaction results in the liberation of gases which must be removed from the material. It is possible to perform this gas removal continuously in this operation through the use of the modification shown in Figs. 5, 6 and 7. The plastic is fed into the feed hopper 20 (Figs. 1 and 2), and advanced by worms 18, 19 through compounding worms 25, 26. The plastic is seized by mixing worms 27, 28 which move it forward while the desired ingredient is injected through inlet 29. As the material advances through the first mixing zone, mixing takes place. This mix then moves into the second mixing zone where it is mixed and advanced by worms 32, 33. Another ingredient can be added at this point through inlet 34. The reaction can start in either the first or second mixing zone depending upon the materials used and the characteristic of the process desired. As the material enters the third zone (Figs. 5, 6 and 7), the pressure on the material is released because of the opening 90 in the top of the casing 91. The worms 92, 93 mix and knead the material continuously exposing new surfaces and permitting volatiles to flash off to the atmosphere. If desired, an appropriate cover can be attached to the casing at flange 94 and a vacuum can be drawn on this section to promote volatile removal. An inert gas may form the atmosphere in this portion of the machine instead of a vacuum or keep a fluid ingredient present for contact with the mix. The worms 92, 93 advance the material through this zone until it is seized by the mixing worms 38, 39 in the fourth zone. Other ingredients may be added in this zone if desired through inlet 40. Additional mixing takes place on the mass which moves forward to the die and is ejected.

Gases, preferably in their liquid state, under pressure may be fed through the plasticizer inlets either for solution or chemical reaction or emulsification with the plastic or for the purpose of a foaming agent. In this latter case, the liquid is thoroughly stirred and dispersed into the plastic and at the release of pressure on the material at or near the die orifice, the liquid vaporizes, expands, and creates a great number of small bubbles in the plastic.

Where material in the gaseous state is to be injected a positive feeding means is provided at a point close to the inlet opening to minimize the fluctuations in flow resulting from the compressive characteristic of the gas, a check valve being provided to prevent the flow of the plastic into the inlet lines when the pressure in the line drops momentarily below that existing in the mixer.

In the dual worm device, a portion of the material is continually passing from one worm to the other through the longitudinal opening between the bores in the casing. The effect of this opening in conjunction with the adjacent worms is that each worm tends to clean out and intermix the material in the more stagnant portions of the other worm. This relatively stagnant portion of the worm is the back face of the helical flight which is an area of lower pressure than the pushing face of the flight.

In the single worm device shown in Figure 8, the method of feeding the ingredients is similar to that employed in the apparatus previously described. The plastic is fed through feed opening 70 where it is seized by the single feed worm 71. The helices 72 on the stem 73 seize the plastic and in co-operation with the inner surface 74 of the cylindrical casing, generate a pressure and forward motion on the material. The plastic is forced through the compounding worm 85 and enters the rear end of the mixing worm 76. Plasticizer is injected through inlet 77 and the material is mixed in this worm and the compounding worm 78 through which the material must pass. This cycle is repeated in the second zone with mixing worm 79 and in the third mixing zone with mixing worm 80. After the mixing operation is completed, the material is expelled through die 81. Jacket spaces 82, 83 and 84 are provided and serve the same function as cited previously.

The mixing action that takes place in the single worm machine, Fig. 8, is different than that which takes place in the dual worm machine, Fig. 3. The intermixing of the material in the low pressure areas of the flight is not subjected to the action of the companion worm. Certain types of materials may be handled and mixing operations performed on the single worm apparatus, usually the less difficult operations.

I claim:

1. A continuous process for plasticizing a material comprising feeding said plasticizable material continuously to a mixing operation, then subjecting said material to pressure forward feeding it while stirring and mixing it, after a predetermined forward feeding of said plasticizable material supplying to it under pressure a relatively small amount of plasticizer while continuing to stir and mix it under pressure to effect a thorough intermixture and corresponding partial plasticizing of said material, continuously discharging said partially plasticized material from said mixing operation while continuing the feeding of said plasticizable material to said forward feeding and mixing operation, continuously receiving said partially plasticized material into an area of reduced pressure in a following mixing operation, applying a pressure forward feeding said material during said mixing, supplying a second charge of plasticizer to said partially plasticized material in said following mixing operation while developing pressure upon it, continuing the mixing to further the plasticizing of said material, and continuously discharging said further plasticized material from said following mixing operation.

2. A continuous process for plasticizing material as set forth in claim 1 in which the said further plasticized material is discharged into an area of lower pressure for subsequent additional similar mixing and plasticizing operations as desired to complete the plasticizing of said material.

3. A continuous process for plasticizing a material as set forth in claim 1 in which the material is in particle form as fed to the first mixing operation.

4. A continuous process for plasticizing a material as set forth in claim 1 in which the material particles are agglomerated at the discharge from the first mixing operation.

5. A continuous process for plasticizing a material as set forth in claim 1 in which the plasticizer at a mixing operation includes a chemical adapted to react with the material.

6. A continuous process for plasticizing a material as set forth in claim 1 in which a subsequent charge of plasticizer is of a different composition than a previous charge of plasticizer.

7. A continuous process for plasticizing a material as set forth in claim 1 in which the supply of plasticizer at a given mixing operation is intermittent in predetermined timed relation to the continuous feed of the material through said operation.

8. A continuous process for plasticizing a material as set forth in claim 1 in which the plasticizer is supplied as a liquid.

9. A continuous process for plasticizing a material as set forth in claim 1 in which the successive mixing operations are supplied with heat to predetermine the relative temperatures of the successive operations.

10. A continuous process for plasticizing a material as set forth in claim 1 in which the fed material is polymer of isobutylene.

11. A continuous process for plasticizing a material as set forth in claim 1 in which the material is polymer of isobutylene and the plasticizer of a mixing operation is paraffin.

12. A continuous process for producing chemical compounds, polymers, and similar materials of a plastic nature comprising feeding a material of plastic nature continuously to a mixing operation, then subjecting said material to a pressure forward feeding it while stirring and mixing it, supplying under pressure a relatively small amount of an ingredient to said material while continuing to stir and mix it under said forward feeding pressure to effect a thorough intermixture, continuously discharging the mixture from said mixing operation while continuing said feeding of said materials to said forward feeding and mixing operation, continuously receiving said mixture in an area of reduced pressure in a following mixing operation, supplying under pressure a second charge of the added ingredient to the mixture in said following mixing operation while developing pressure upon it and continuing the said forward feeding and mixing to further the intimate mixing of the materials and continuously discharging said further mixed materials from said following mixing operation into an area of lower pressure where the mixing is continued and the mixture advanced while exposing a predetermined surface thereof to reduce pressure for elimination of fluids, and then advancing the material and again developing forward feeding pressure on it to continue the forward feeding and mixing of the mass and then discharging it.

13. A continuous process as set forth in claim 12 in which a subsequent charge of added ingredient is of a different composition from a previous charge of added ingredient.

14. A continuous process as set forth in claim 12 wherein the elimination of fluids is carried out in an area at a pressure below atmospheric.

15. A continuous process as set forth in claim 13 wherein the elimination of fluids is carried out in an area at a pressure below atmospheric.

16. A continuous process as set forth in claim 12 wherein the elimination of fluids is carried out in an area where an inert fluid is maintained in contact with the mix.

17. A continuous process as set forth in claim 12 wherein the elimination of fluids is carried out in an area where a fluid is maintained in contact with the mix for reaction therewith.

18. An apparatus for continuously mixing materials comprising a casing having a pair of parallel intersecting cylindrical bores with a longitudinal opening between them having helical members closely fitting the inside of the bores with a feed opening at one end to receive a material which is advanced under forward feeding pressure by the helical members, the initial advancing portion of the helical members being followed by a rotary obstructing portion which cooperates with the first helical portion to generate pressure on the material but nevertheless permitting the material to pass through into an area of reduced pressure supplied with rotary helices of a forward lead and having a passage from without the surface of the casing permitting at said area the injection of an ingredient under pressure to be stirred and mixed with the feed material and advanced while the pressure on the mix is increased and forward feeding and mixing is continued, and means discharging the mix into a subsequent area of reduced pressure equipped with rotary helices of a forward lead, and means repeating said injections to desired blending of the ingredients of the mix, and discharging the blended mixture.

19. An apparatus for continuously mixing materials as set forth in claim 18 in which there are means at an intermediate point discharging fluids from the mix.

20. An apparatus for continuously mixing materials as set forth in claim 19 in which at the intermediate point the fluids are discharged in an area where the pressure is below atmospheric.

21. An apparatus for continuously mixing materials as set forth in claim 18 in which the material advancing means is a single helical worm.

22. An apparatus for continuously mixing materials as set forth in claim 19 in which the material advancing means is a single helical worm.

23. An apparatus for continuously mixing materials as set forth in claim 20 in which the material advancing means is a single helical worm.

References Cited in the file of this patent

UNITED STATES PATENTS

| Number | Name | Date |
|---|---|---|
| 1,246,003 | Headley | Nov. 6, 1917 |
| 1,727,753 | De Bethune | Sept. 10, 1929 |
| 1,941,808 | McConnaughay | Jan. 2, 1934 |
| 1,948,871 | Quehl | Feb. 27, 1934 |
| 2,183,763 | Brown | Dec. 19, 1939 |
| 2,581,451 | Sennet | Jan. 8, 1952 |
| 2,584,225 | Plunguian et al. | Feb. 5, 1952 |